United States Patent
Shihab

(10) Patent No.: US 7,725,804 B2
(45) Date of Patent: May 25, 2010

(54) ERROR CORRECTION MANAGEMENT BASED ON MESSAGE TYPE DETERMINATION

(75) Inventor: Jamil M. Shihab, Algonquin, IL (US)

(73) Assignee: Motorola, Inc., Schaumburg, IL (US)

( * ) Notice: Subject to any disclaimer, the term of this patent is extended or adjusted under 35 U.S.C. 154(b) by 289 days.

(21) Appl. No.: 11/861,048

(22) Filed: Sep. 25, 2007

(65) Prior Publication Data
US 2009/0081993 A1 Mar. 26, 2009

(51) Int. Cl.
H03M 13/00 (2006.01)
(52) U.S. Cl. .................. 714/758; 714/786; 714/799
(58) Field of Classification Search .............. 714/748, 714/758, 760, 799
See application file for complete search history.

(56) References Cited

U.S. PATENT DOCUMENTS

| | | | | |
|---|---|---|---|---|
| 5,007,051 | A * | 4/1991 | Dolkas et al. | 370/235 |
| 6,496,520 | B1 * | 12/2002 | Acosta | 370/474 |
| 7,012,893 | B2 * | 3/2006 | Bahadiroglu | 370/231 |
| 7,136,710 | B1 * | 11/2006 | Hoffberg et al. | 700/83 |
| 7,218,665 | B2 * | 5/2007 | McElwain | 375/143 |
| 7,362,714 | B2 * | 4/2008 | Richardson et al. | 370/242 |
| 7,522,531 | B2 * | 4/2009 | Joiner et al. | 370/245 |
| 2007/0133566 | A1 * | 6/2007 | Copps | 370/395.52 |

OTHER PUBLICATIONS

Chakareski Jacob and Chou, Philip A.: Application Layer Error Correction Coding for Rate-Distortion Optimized Streaming to Wireless Clients, Technical Report MSR-TR-2002-01, Aug. 18, 2002, Microsoft Research Microsoft Corporation, Http://www.research.microsoft.com, pp. 1-29.

Meggers, Jens and Wallbaum, Michael: Application Level Error Recovery Using Active Network Nodes, Department of Computer Science 4, Aachen University of Technology, 52056 Aachen, Germany, 0-7695-0722-0/00 $10.00 © 2000 IEEE, pp. 540-545.

* cited by examiner

*Primary Examiner*—Esaw T Abraham

(57) ABSTRACT

A method, wireless receiver, and wireless communication system manage error correction of received wirelessly transmitted messages. A High Level network layer component identifies unique values within a message type associated with a communication link. The High Level network layer component determines a message signature associated with the message type. Decoding rules associated with the message type are generated by the High Level network layer component. The decoding rules include a set of acceptable/unacceptable errors associated with the message type. The decoding rules are sent via the High Level network layer component, to a component at a network layer that is lower than the High Level network layer component. The Low Level network layer component decodes, based on the decoding rules, at least a portion of a wirelessly transmitted message that has been received.

20 Claims, 5 Drawing Sheets

ERROR CORRECTION MANAGEMENT BASED ON MESSAGE TYPE DETERMINATION

FIELD OF THE INVENTION

The present invention generally relates to the field of wireless communications, and more particularly relates to determining a message type associated with a received message and managing error correction procedures based on the determined message type.

BACKGROUND OF THE INVENTION

Wireless communication systems utilize error correction techniques to overcome corrupted transmissions. However, many of these techniques unnecessarily request retransmissions of corrupted messages. For example, conventional error correction techniques require every bit to be received correctly even if the importance of a bit is minimal. Requesting retransmissions in these situations wastes valuable bandwidth.

Therefore a need exists to overcome the problems with the prior art as discussed above.

SUMMARY OF THE INVENTION

Briefly, in accordance with the present invention, disclosed are a method, wireless receiver, and wireless communication system for managing error correction of received wireless messages. The method includes identifying, by a High Level network layer component, unique values within at least one message type associated with a communication link. The High Level network layer component determines a message signature associated with the at least one message type. Decoding rules associated with the at least one message type are generated by the High Level network layer component in response to the identifying. The decoding rules comprise a set of acceptable errors associated with the at least one message type and a set of unacceptable errors associated with the at least one message type. The decoding rules are sent via the High Level network layer component, to a component at a network layer that is lower than the High Level network layer component. The Low Level network layer component decodes a wireless transmitted message that has been received based on the decoding rules.

In another embodiment a wireless receiver communicatively coupled to a wireless communication network is disclosed. The wireless receiver comprises a memory and a processor that is communicatively coupled to the memory. A message signature determiner residing within a High Level network layer identifies unique values within at least one message type associated with a communication link. The message signature determiner is also determines a message signature associated with the at least one message type in response to the unique values which have been identified. The message signature determiner generates decoding rules associated with the at least one message type in response to the message signature that has been determined. The decoding rules comprise a set of acceptable errors associated with the at least one message type and a set of unacceptable errors associated with the at least one message type. A message decoding manager residing within the High Level network layer sends the decoding rules to a message decoder residing at a network layer that is lower than the High Level network layer component. The message decoder decodes a wirelessly transmitted message that has been received based on the decoding rules.

In yet another embodiment, a wireless communication system for managing error correction of received wireless messages is disclosed. The wireless communication system comprises a plurality of base stations and a plurality of wireless receivers communicatively coupled to at least one base station in the plurality of base stations. At least one wireless receiver comprises a memory and a processor that is communicatively coupled to the memory. A message signature determiner residing within a High Level network layer identifies unique values within at least one message type associated with a communication link. The message signature determiner is also determines a message signature associated with the at least one message type in response to the unique values which have been identified. The message signature determiner generates decoding rules associated with the at least one message type in response to the message signature that has been determined. The decoding rules comprise a set of acceptable errors associated with the at least one message type and a set of unacceptable errors associated with the at least one message type. A message decoding manager residing within the High Level network layer sends the decoding rules to a message decoder residing at a network layer that is lower than the High Level network layer component. The message decoder is decodes a wirelessly transmitted message that has been received based on the decoding rules.

An advantage of one of the embodiments of the present invention is that a high level network layer and a low level layer are integrated to minimize retransmission of messages in error, thereby maximizing available bandwidth in a system. One embodiment of the present invention utilizes bit streams of message sequences to determine the message type of a received message. A complete message may be compiled from message sequences identified to be correct based on the determined message type. Therefore, if one or more bit sequences are received incorrectly, the receiving device can still compile the received message, thereby avoiding costly retransmissions of the message. This is advantageous over conventional techniques because a character or bit within a message may not be important and the message can still be compiled and accepted. Conventional techniques, on the other hand, request retransmission of a message with only a single error (even if that error is nominal), thereby wasting valuable bandwidth.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The term "wireless device" is intended to broadly cover many different types of devices that can wirelessly receive signals, and optionally can wirelessly transmit signals, and may also operate in a wireless communication system. For example, and not for any limitation, a wireless communication device may comprise any one or a combination of the following: a two-way radio, a cellular telephone, a mobile phone, a smartphone, a two-way pager, a wireless messaging device, a laptop/computer, automotive gateway, residential gateway, and/or any other communication device that is capable of wireless communication as would be obvious to one of ordinary skill in the art in view of the present discussion.

Wireless Communication System

Figure 1:
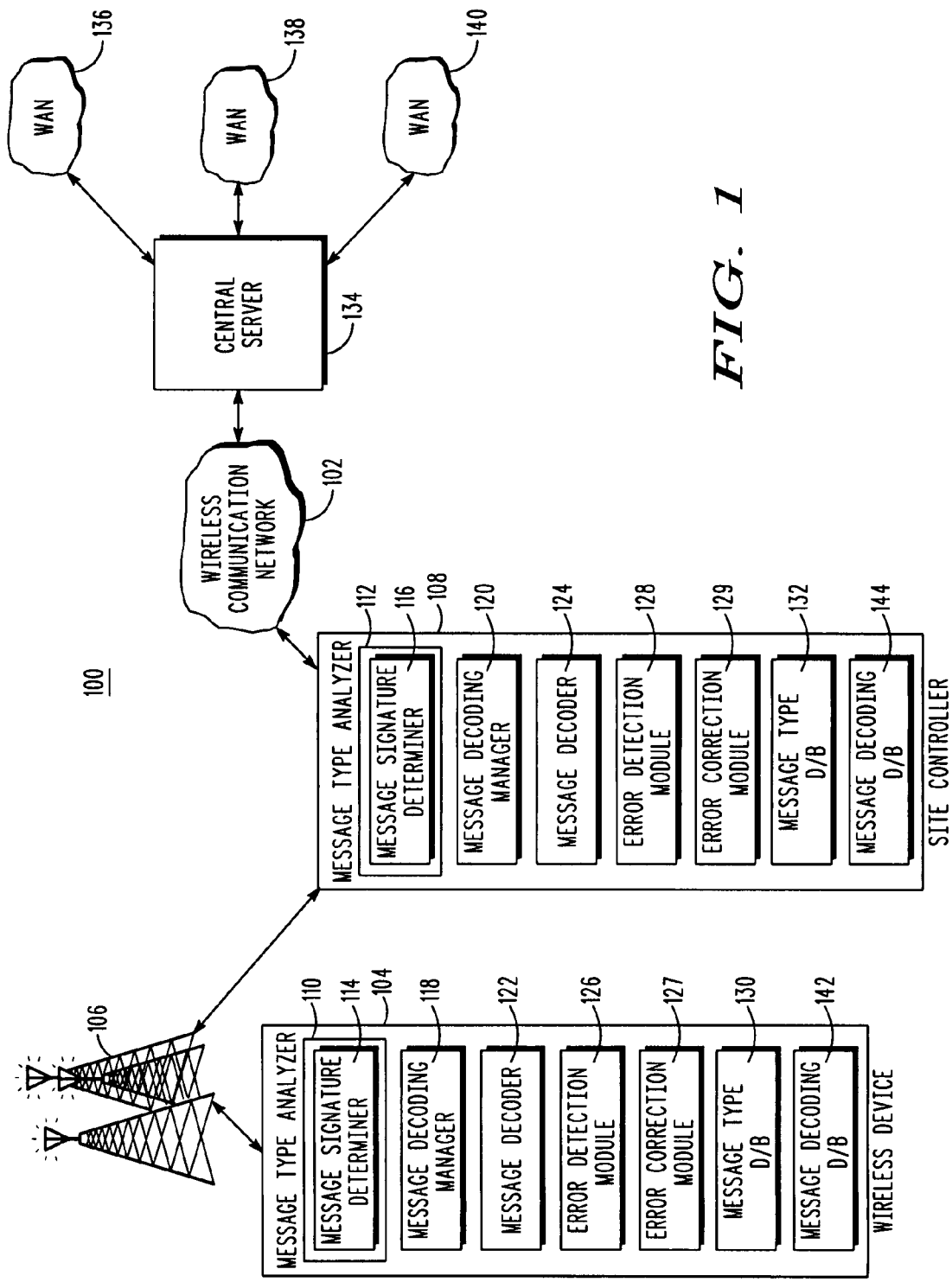
FIG. 1 is block diagram illustrating a wireless communication system, according to one embodiment of the present invention.

According to one embodiment of the present invention as shown in FIG. 1 a wireless communication system 100 is illustrated. FIG. 1 shows a wireless communication network 102 that comprises one or more access networks. An access network may be a circuit service network and/or a packet data network. In one embodiment, a packet data network is an IP or SIP based connectivity network, which provides data connections at much higher transfer rates than a traditional circuit services network. A packet data network may comprise an Evolution Data Only ("EV-DO") network, a General Packet Radio Service ("GPRS") network, a Universal Mobile Telecommunications System ("UMTS") network, an 802.11 network, an 802.16 (WiMax) network, Ethernet connectivity, dial-up modem connectivity, or the like. A circuit services network provides, among other things, voice services to the wireless device.

The communications standard of the wireless communication network 102, according to the present example, may comprise one or more of the following: Code Division Multiple Access (CDMA), Time Division Multiple Access (TDMA), Global System for Mobile Communications (GSM), General Packet Radio Service (GPRS), Frequency Division Multiple Access (FDMA), other IEEE 802.16 standards, Orthogonal Frequency Division Multiplexing (OFDM), Orthogonal Frequency Division Multiple Access (OFDMA), Wireless LAN (WLAN), WiMax. Other applicable communications standards include those used for Public Safety Communication Networks including TErrestrial TRunked rAdio (TETRA).

The wireless communication system 100 supports any number of wireless devices 104 which may be single mode or multi-mode devices. Multi-mode devices are capable of communicating over multiple access networks with varying technologies. For example, a multi-mode device can communicate over various access networks various services such as Push-To-Talk ("PTT"), Push-To-Talk Over Cellular ("PoC"), multimedia messaging, web browsing, VoIP, multimedia streaming, and other communication services as would be obvious to one of ordinary skill in the art in view of the present discussion. The wireless device 104, in one embodiment, includes a message type analyzer 110 comprising a message signature determiner 114. The wireless device 104 also includes a message decoding manager 118, a message decoder 122, an error detection module 126, an error correction module 127, a message type database 130, and a message decoding database 142. Each of these components is discussed in greater detail below.

The wireless communication system 100 also includes a plurality of base stations 106 that are communicatively coupled to the wireless communication network 102 and one or more wireless devices 104. Each base station 106 is communicatively coupled to a site controller 108. The site controller 108, similar to the wireless device 104, includes a message type analyzer 112 that includes a signature determiner 116. The site controller 108 also includes a message decoding manager 120, a message decoder 124, an error detection module 128, an error correction module 129 a message type database 132, and a message decoding database 144. Each of these components is discussed in greater detail below.

One or more information processing systems 134 such as a central server 134 are communicatively coupled to the wireless communication network. The information processing system 134 communicatively couples a wide area network ("WAN") 136, local area network ("LAN") 138, and public switched telephone network ("PSTN") 140 to the wireless communication network 102.

Error Correction Management Based On Determined Message Type

As discussed above, with many conventional error correction techniques, if any bits within a received message are incorrect or corrupted the message is nullified and a retransmission of the message is requested. Conventional error correction techniques require every bit to be received correctly even if the importance of a bit is minimal. Requesting retransmissions in these situations wastes valuable bandwidth. One embodiment of the present invention utilizes bit streams of message sequences to determine the message type of a received message. A complete message can be compiled from message sequences identified to be correct based on the determined message type. Therefore, if one or more bit sequences are received incorrectly, such embodiment of the present invention can still compile and accept the message, thereby avoiding costly retransmissions of the message.

In one embodiment, High Level network layer components in a multi-layer environment implementation, such as Application layer components in a SIP based network or L3 components in a CDMA based network, analyze possible message type structures that can be received on a particular link prior to a message being received on the link. According to one embodiment of the present invention, the multi-layer environment comprises, for example, a plurality of stacked layers of software components. In various alternative embodiments, each of the stacked layers can comprise any combination of hardware, firmware, and software, components.

Figure 2:
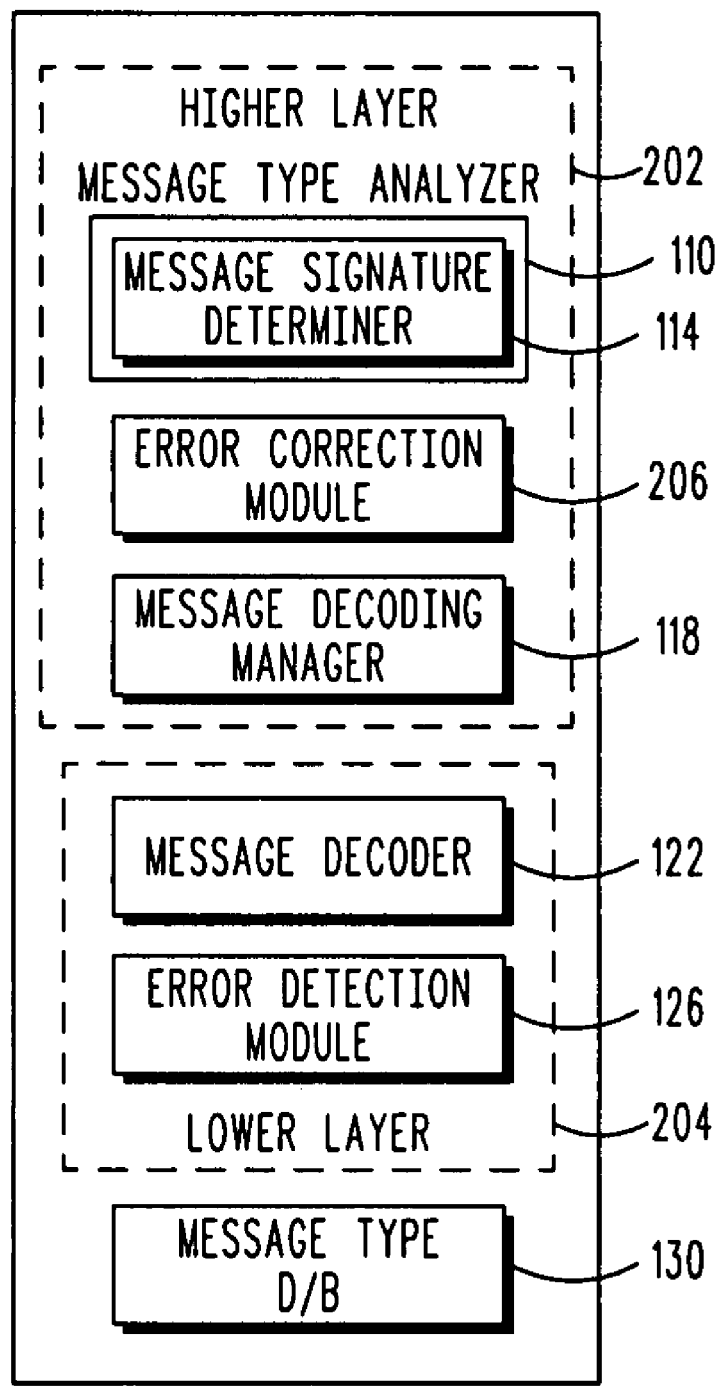
FIG. 2 is a block diagram illustrating a detailed view of a High Level network layer and a corresponding Low Level network layer according to one embodiment of the present invention.

FIG. 2 shows examples of the message type analyzer 110, message signature determiner 114, and message decoding manager 118, residing in a High Level network layer 202. FIG. 2 also shows an error correction module 206 (that corresponds to the error correction module 127, 129 of FIG. 1) residing in the High Level network layer 202. The High Level network layer 202, in one embodiment, performs, among other things, error correction. It should be noted that the example of FIG. 2 is applicable to both of the wireless device 104 and site controller 106.

The message decoder 122 and error detection module 126 of the wireless device 104 and site controller 106, according to the present example, reside in a Low Level network layer 204. The Low Level network layer 204, in one embodiment, is a layer that performs error detection at a message handling level that is lower than the High Level network layer 202, and that requests retransmissions. The Low Level network layer 204 can vary depending on the wireless communication system technology. For example, in a CDMA system the Low Level network layer 204 can comprise the interface to a physical layer.

The message type analyzer 110, residing in the High Level network layer 202, analyzes message types for particular communication links and determines a message signature, via the message signature determiner 114, associated with each message type. In other words, the message type analyzer 110 determines a unique identification associated with the message type(s) of a particular link. In one embodiment, the message signature analyzer 114 identifies the communication link used to receive the message. For example, the message signature analyzer 114 can determine that the message is to be received over a SIP-based link. Therefore, the message signature analyzer 114 determines that the message signature can be narrowed down to a SIP-based message.

The message type analyzer 110 can retrieve a list of messages from message type database 130 that identifies possible messages utilized over a SIP-link, CDMA link, and the like. The message signature analyzer 114 analyzes the list of possible messages and a set of bit sequences that are unique to the messages from an array of possible values for given fields. For example, if certain messages include system time and a repeated sequence of higher order time (corresponding to year, month, and the like). This provides a hint of the system time field and the possible message. The start and stop of the unique sequence (message signature) can be used to determine the type and start of the message. It should be noted that the message type analyzer 110 can also analyze other bit streams associated with a message type for uniquely identify the message type.

Another example can be illustrated using a SIP INVITE message. It should be noted that even though a SIP message is used throughout this discussion, the present invention is not limited to this message type or to the SIP protocol other protocols such as CDMA may also be used. An example of a SIP message is INVITE sip:client@motorola.com SIP/2.0. Every character in the SIP INVITE message is not essential for correctly receiving the message. Therefore, an error in some of the characters can still result in a valid transaction. Conventional error correction methods nullify the message if a single character is received incorrectly.

For example, consider the following received message: INVGHE hip&client@motorola.com*SAP/2.0. A conventional error correction system would nullify this message because it comprises at least one error. However, according to one embodiment of the present invention, a receiving system allows for this received message to be corrected based on knowledge of the SIP syntax. For example, the message signature determiner 114 determines a unique signature associated with various message types. It should be noted that in one embodiment, the message type analyzer 110 determines a message signature prior to a message being received at the Lower Level network level 204. However, in other embodiments a message signature can also be determined after the Lower Level network level 204 receives a message.

One example of determining a unique signature for a message is based at least in part on the High Level network layer's analysis of a particular link. For example, the High Level network layer 202, as discussed above, determines the type of messages that can be received on a given link. The High Level network layer 202 also determines possible permutations/combinations of the fields in the messages. Possible message types and possible permutations/combinations of the fields are determined because message types and permutations can change based on a current state of a session or transaction or known possible values.

For example, in a SIP based network there are currently only seven possible commands that can be received. The sizes of these command names vary from three to eight. However, only three characters are necessary to uniquely identify any command. Domain knowledge is used by the High Level network layer 202 to identify these three characters, which vary from application to application. In the SIP example, using the first three characters are sufficient. However other combinations are also possible. Therefore any set of messages that can be received on a link can be analyzed for unique and non-unique possible message bit/char combinations.

The unique signature can include an error correction mask (e.g., decoding rules) and any specific values associated with the message that are known such as characters with a value of 0 (e.g., a space between characters). For example in a SIP INVITE message there is always a space after the "INVITE". Therefore, in one embodiment of the present invention, if another character is received, it can safely be ignored. The error correction mask is determined based on the message type analyzer 110 determining that the received message is a SIP message.

In one embodiment, the message signature determiner 114 can query a message decoding database 142 to retrieve an error correction mask associated with particular message. An example of an error correction mask associated with the message INVGHE hip&client@motorola.com*SAP/2.0 is ***-- --:*..*---**.*. The character "*" represents a required correct reception and the character "-" represents where an error is acceptable. In other words, the error correction mask provides decoding rules such as which characters in a message can be or cannot be received incorrectly. In this example, the first three characters such as "INV" need to be received as "INV". However, the next three characters, which should be "ITE", can be accepted as any characters such as "GHE" as in this example. The unique signature can also comprise acceptable error levels and weighting information. For example, a particular application may allow for a message to comprise errors but only up to a given error threshold.

Also an error at one character can be assigned a higher weight than an error at another character. For example, with respect to a SIP INVITE message the weight of the first three characters is to be weighted at a highest level, e.g. 1, and other non-unique characters can be 0. The error threshold is determined by the application as, for example, 3 for just the command. If a total error weight of less than 3 was received, then message is determined to not be correctable. The weighting scheme allows for the extension of the unique bits/characters beyond what is just required. For example, instead of designating the first 3 characters as being unique, the first 4 characters can be designated as being unique, but provide an error threshold of 3. This way, it does not matter which 3 of the unique characters are correct, i.e. any 3 are sufficient.

A message decoding manager 118 within the High Level network layer 202 interfaces with the Low Level network layer 204 and transmits the unique signature and decoding rules to a message decoder 122. The message decoder 122 analyzes the unique signature and determines the message type of the received message. For example, the message decoder 122 uses information within the unique signature to query a message type database 132. The message type database 132 comprises information associated with various message types. The message decoder 122 can then determine the message type. In the current example, the message decoder determines that the message is a SIP-based message. The message decoder 122 then uses the error correction mask, ***--- ---:*..*---**.* in the current example, to decode the message.

The error detection module 126 identifies the errors within the message and based on the error correction mask determines if these errors are acceptable. For example, the error detection module 126 identifies that the message INVGHE hip&client@motorola.com*SAP/2.0 comprises errors such as "GHE", "hip", "&", and "*". The error detection module 126 determines that the errors such as "G", "H", and "E" are allowable based on the error correction mask. The error detection module 126 determines that, in this example, any errors in the message are within acceptable bounds. Therefore, the Low Level network layer 204 forwards the message back to the High Level network layer 202. The High Level network layer 202 via the error correction module 206, auto-completes the message if it comprises any errors based on the message type recognition performed at the lower layer.

For example, the High Level network layer 202 transforms the message INVGHE hip&client@motorola.com*SAP/2.0 into INVITE sip:client@motorola.com.SAP/2.0. The corrected message (or original message if it does not have any errors) is then forwarded to the appropriate application by the High Level network layer 202. However, in one embodiment, if the message comprises a number of errors greater than an error threshold or errors that are not acceptable, the Low Level network layer 204 requests retransmissions of the message.

As can be seen from the above discussion, one embodiment of the present invention integrates both the High Level network layer 202 and a Low Level network layer 204 to minimize retransmissions, thereby maximizing available bandwidth in a system. The present invention, in one embodiment, also allows errors to be accepted at various locations within a message depending on the message type. This is advantageous over the conventional techniques because a character or bit within a message may not be important and the message can still be compiled. Conventional techniques, on the other hand, request retransmission of a message with only a single error, thereby wasting valuable bandwidth even if the single error would be harmless to a particular application and could have been ignored.

Wireless Device

Figure 3:
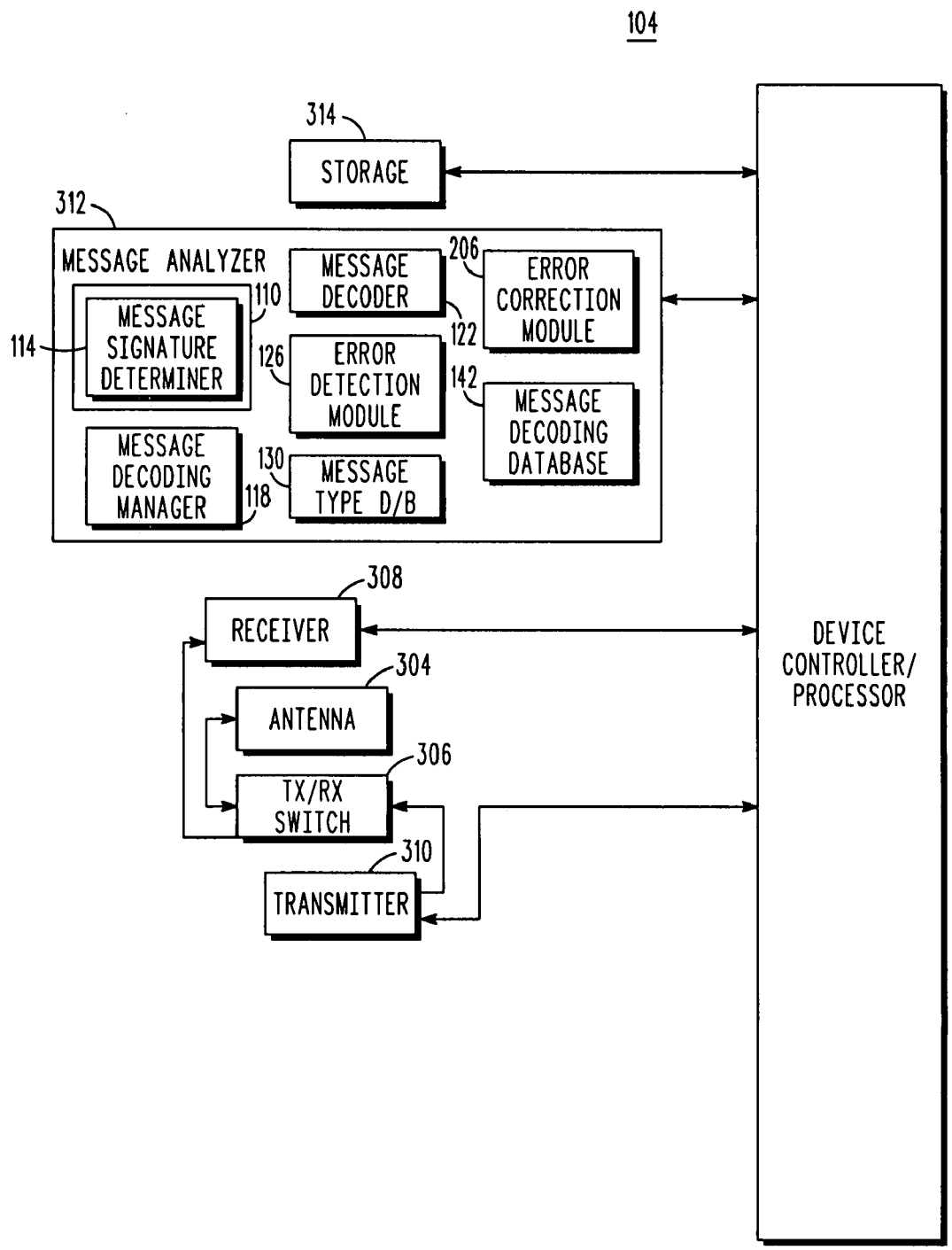
FIG. 3 is a block diagram illustrating a detailed view of a wireless device according to one embodiment of the present invention.

FIG. 3 is a block diagram illustrating a detailed view of the wireless device 104 according to an embodiment of the present invention. It is assumed that the reader is familiar with wireless communication devices. To simplify the present description, only that portion of a wireless communication device that is relevant to the present invention is discussed.

The wireless device 104 operates under the control of a device controller/processor 302, that controls the sending and receiving of wireless communication signals. In receive mode, the device controller 302 electrically couples an antenna 304 through a transmit/receive switch 306 to a receiver 308. The receiver 308 decodes the received signals and provides those decoded signals to the device controller 302.

In transmit mode, the device controller 302 electrically couples the antenna 304, through the transmit/receive switch 306, to a transmitter 310. It should be noted that in one embodiment, the receiver 308 and the transmitter 310 are a dual mode receiver and a dual mode transmitter for receiving/transmitting over various access networks providing different air interface types. In another embodiment a separate receiver and transmitter is used for each of type of air interface.

The device controller 302 operates the transmitter and receiver according to instructions stored in the memory 312. These instructions include, for example, a neighbor cell measurement-scheduling algorithm. The memory 312, in one embodiment, includes the message type analyzer 110, message signature determiner 114, message decoding manager 118, message decoder 122, error detection module 126, error correction module 127, message type database 130, and message decoding database 142, which have been discussed above in greater detail. These components have not been shown in FIG. 3. Although shown as residing in memory 312, each of these components can also be implemented as hardware. The wireless device 108, also includes non-volatile storage memory 314 for storing, for example, an application waiting to be executed (not shown) on the wireless device 108.

Information Processing System

Figure 4:
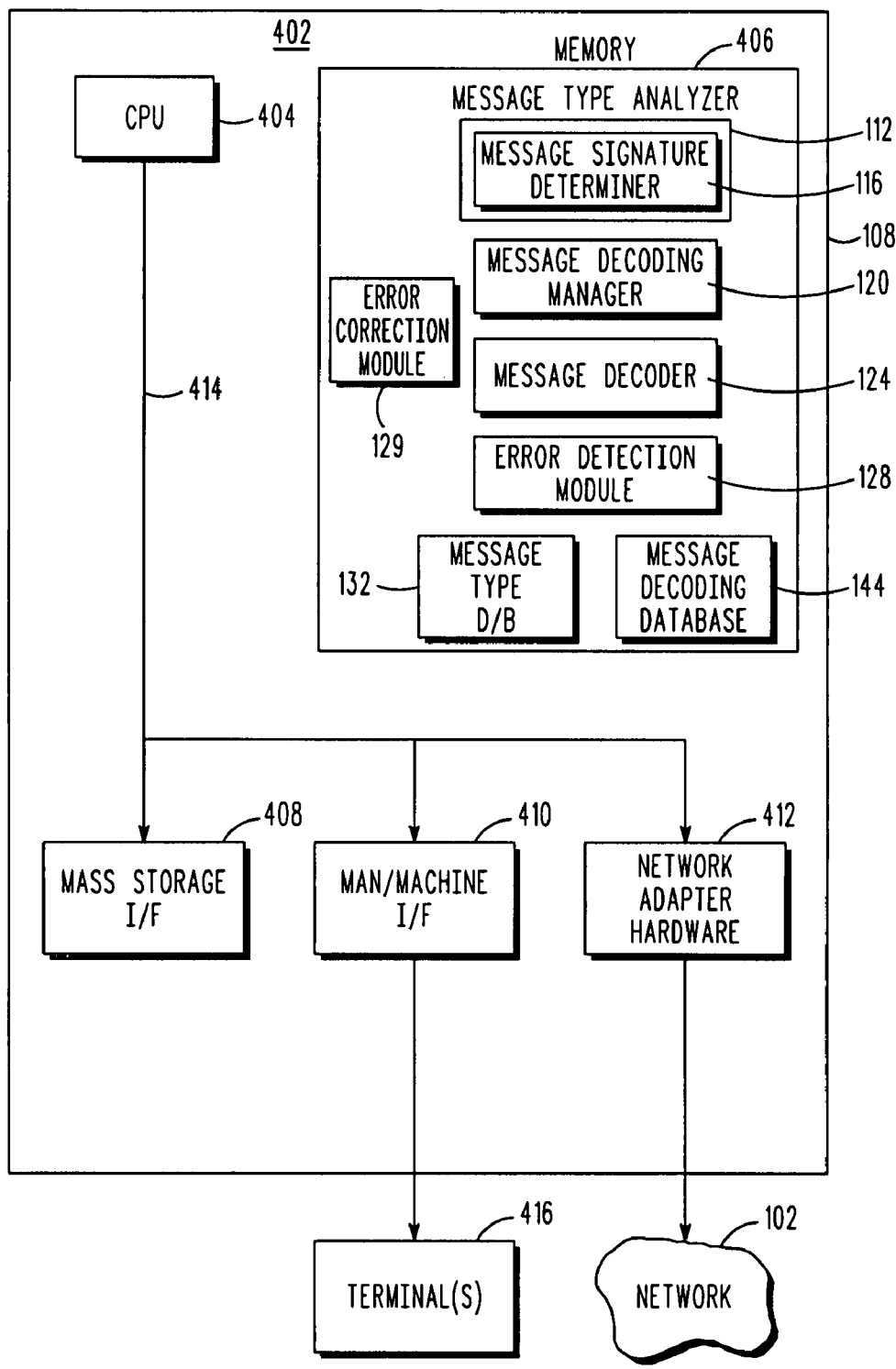
FIG. 4 is a block diagram illustrating a detailed view of a site controller according to one embodiment of the present invention.

FIG. 4 is a block diagram illustrating a more detailed view of an information processing system 108 such as in one example the central server 108. The information processing system 108 is based upon a suitably configured processing system adapted to implement the embodiment of the present invention. For example, a personal computer, workstation, or another computing system, may be used. The information processing system 108 includes a computer 402. The computer 402 has a processor 404 that is connected to a main memory 406, a mass storage interface 408, a man-machine interface 410, and network adapter hardware 412. A system bus 414 interconnects these system components.

The main memory 406 includes the message type analyzer 112, message signature determiner 116, message decoding manager 120, message decoder 124, error detection module 128, error correction module 129, message type database 132, and message decoding database 144. Although illustrated as concurrently resident in the main memory 406, it is clear that respective components of the main memory 406 are not required to be completely resident in the main memory 406 at all times or even at the same time. One or more of these components, or portions of these components, can be implemented as hardware.

The mass storage interface 408 can store data on a hard-drive or media such as a CD. Man-machine interface 410 allows technicians, administrators, and users, to directly connect to the information processing system 108 via one or more terminals 416. The network adapter hardware 412 is used to provide an interface to the wireless communication network 102, a public network such as the Internet, and any other suitable network as should be obvious to one of ordinary skill in the art in view of the present discussion. Certain embodiments of the present invention are able to be adapted to work with any data communications connections including present day analog and/or digital techniques or via a future networking mechanism.

Process Of Managing Error Correction

Figure 5:
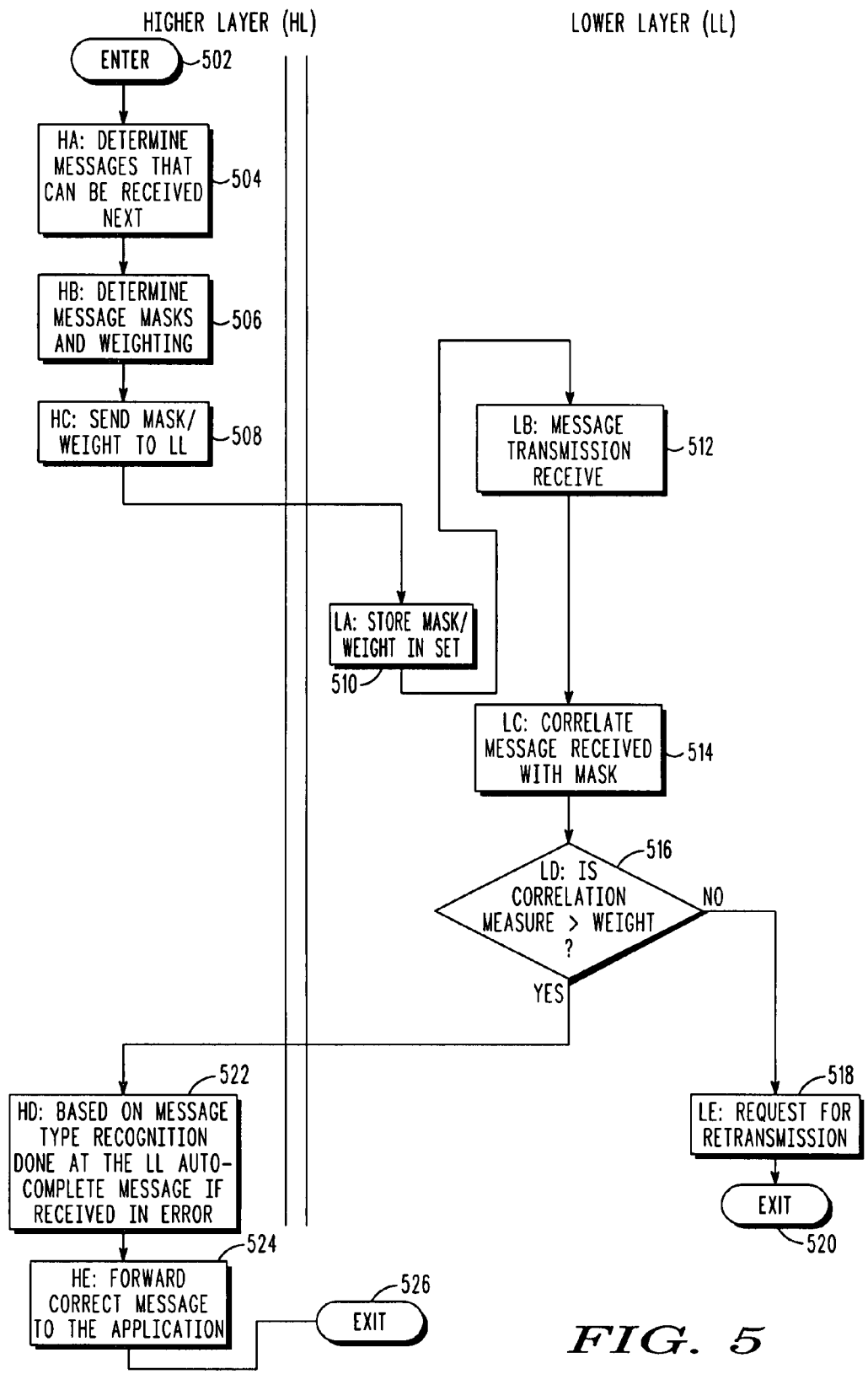
FIG. 5 is an operational flow diagram illustrating a process for managing error correction of a received message according to one embodiment of the present invention.

FIG. 5 is an operational flow diagram illustrating a process of managing error correction of a received message, or portion of a message, based on a determined message type. It should be noted that the following process can be performed at any wireless receiver. The operational flow diagram of FIG. 5 begins at step 502 and flows directly to step 504. The message type analyzer 110 in the High Level network layers 202, at step 504, determines messages that can be received next. As discussed above, according to one embodiment, there are only a finite set of messages that can possibly be received on a given link. In the SIP example, there are currently only seven commands that can be received. These commands can be up to eight characters long. The message type analyzer 110 determines possible messages and determines possible value field sizes and possible field values. This step can be done during initialization of the receiver application and can also be updated based on the state of a transaction such as when a transaction is being setup or in progress or in teardown.

The message signature determiner 114, at step 506, determines a signature of a received message including an error correction mask. A message decoding manager 118, at step 508, sends the message signature (and error correction mask(s)), weights, and error correction levels to a message decoder 122 at a Low Level network layer 204. The Low Level network layer 204 stores the message signature (and error correction mask(s)), weights, and error correction levels. The message, at step 512, is received by the message decoder 122. The message decoder 122, at step 514, identifies the message type and correlates the message with the received error correction mask. The message decoder 122, at step 516, determines if the correlation measure is greater than a given error threshold of weight. If the result of this determination is negative, the Low Level network layer, at step 518, requests a retransmission of at least a portion of the message. The control flow exits at step 520. If the result of this determination, at step 516, is positive, the message is forwarded to the High Level network layer 202, wherein the error correction module 206, at step 522, based on the recognized message type autocompletes the message if errors were detected. The error correction module 206 residing in the High Level network layer 202, at step 522, then forwards the corrected message (or original message) to an application. The control flow then exits at step 526.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover all applications, modifications, and embodiments within the scope of the present invention.

What is claimed is:

1. A method, with a wireless receiver communicatively coupled to a wireless communication network, for managing error correction of received wireless messages, the method comprising:

identifying, by a High Level network layer component of a device in the wireless communication network, unique values within at least one message type associated with a communication link;

determining, by the High Level network layer component of the device in the wireless communication network, a message signature associated with the at least one message type;

generating, with the High Level network layer component of the device in the wireless communication network, in response to the identifying, decoding rules associated with the at least one message type, wherein the decoding rules comprise a set of acceptable errors associated with the at least one message type and a set of unacceptable errors associated with the at least one message type to thereby manage the error correction of the at least one message type;

sending, with the High Level network layer component of the device in the wireless communication network, the decoding rules to a component of the device in the wireless communication network at a network layer that is lower than the High Level network layer component; and decoding, with the Low Level network layer component of the device in the wireless communication network, at least a portion of a wirelessly transmitted message that has been received based on the decoding rules.

2. The method of claim 1, wherein the decoding rules comprise at least one of:

an error correction mask indicating which bits within a message associated with the at least one message type are ignored for determining messaging error and which bits within the message are to be error free for determining messaging error;

an allowable error threshold associated with the message; and error weighting parameters associated with each bit in the message.

3. The method of claim 1, wherein the decoding further comprises:

determining a unique signature associated with a wirelessly transmitted message; and determining, with the Low Level network layer component, a message type associated with the wirelessly transmitted message based on the determined unique signature associated with the wirelessly transmitted message.

4. The method of claim 1, further comprising:

determining by the Low Level network layer component of the device in the wireless communication network, in response to the decoding, if the wirelessly transmitted message comprises errors; and if the wirelessly transmitted message comprises errors, identifying, based on the decoding rules, a set of errors that are acceptable in the wirelessly transmitted message and a set of errors that are unacceptable in the wirelessly transmitted message.

5. The method of claim 4, wherein if the at least a portion of the wirelessly transmitted message comprises a set of errors that are unacceptable, requesting, by the Low Level network layer component of the device in the wireless communication network, retransmission of at least a portion of the wirelessly transmitted message.

6. The method of claim 4, wherein if the wirelessly transmitted message comprises errors that are acceptable, correcting, by the High Level network layer component of the device in the wireless communication network, based on a message type associated with the wirelessly transmitted message, the errors that are acceptable in the wirelessly transmitted message; and communicatively coupling the corrected wirelessly transmitted message to an application associated with the corrected wirelessly transmitted message.

7. A wireless receiver, communicatively coupled to a wireless communication network, the wireless receiver comprising:
 a memory;
 a processor communicatively coupled to the memory;
 a message signature determiner, residing within a High Level network layer, wherein the message signature determiner:
  identifies unique values within at least one message type associated with a communication link,
  determines a message signature associated with the at least one message type in response to the unique values which have been identified, and
  generates decoding rules associated with the at least one message type in response to the message signature being determined, wherein the decoding rules comprise a set of acceptable errors associated with the at least one message type and a set of unacceptable errors associated with the at least one message type;
 a message decoding manager, residing within the High Level network layer, wherein the message decoding manager sends the decoding rules to a message decoder residing at a network layer that is lower than the High Level network layer; and
 the message decoder wherein the message decoder decodes at least a portion of a wirelessly transmitted message that has been received based on the decoding rules.

8. The wireless receiver of claim 7, wherein the decoding rules comprise at least one of:
 an error correction mask indicating which bits within a message associated with the at least one message type are ignored for determining messaging error and which bits within the message associated with the at least one message type are to be error free for determining messaging error;
 an allowable error threshold associated with the message associated with the at least one message type; and
 error weighting parameters associated with each bit in the message associated with the at least one message type.

9. The wireless receiver of claim 7, wherein the message decoder further determines a unique signature associated with the wirelessly transmitted message.

10. The wireless receiver of claim 9, wherein the message decoder further determines a message type associated with the wirelessly transmitted message based on the determined unique signature associated with the wirelessly transmitted message.

11. The wireless receiver of claim 7, wherein the message decoder further determines, in response to the decoding, if the wirelessly transmitted message comprises errors; and
 if the wirelessly transmitted message comprises errors, based on the decoding rules, the message decoder identifies a set of errors that are acceptable in the wirelessly transmitted message and a set of errors that are unacceptable in the wirelessly transmitted.

12. The wireless receiver of claim 11, further comprising:
 an error detection module, residing in the Low Level network layer, wherein the error detection module requests retransmission of at least a portion of the wirelessly transmitted message in response to the wirelessly transmitted message comprising a set of errors that are unacceptable based on the decoding rules.

13. The wireless receiver of claim 11, further comprising:
 an error correction module residing in the High Level network layer, wherein if the wirelessly transmitted message comprises errors that are acceptable based on the decoding rules, the error correction module
  corrects the errors that are acceptable based on a message type associated with the wirelessly transmitted message and
  communicatively couples the corrected wirelessly transmitted message to an application associated with wirelessly transmitted message.

14. A wireless communication system for managing error correction of received wirelessly transmitted messages, the wireless communication system comprising:
 a plurality of base stations; and
 a plurality of wireless receivers communicatively coupled to at least one base station in the plurality of base stations, wherein at least one wireless receiver comprises:
  a memory;
  a processor communicatively coupled to the memory;
  a message type analyzer residing within a High Level network layer wherein the message type analyzer receives a wirelessly transmitted message;
  a message signature determiner residing within a High Level network layer wherein the message signature determiner identifies unique values within at least one message type associated with a communication link, wherein the message signature determiner also determines a message signature associated with the at least one message type in response to the unique values which have been identified, and wherein the message signature determiner further generates decoding rules associated with the at least one message type in response to the message signature that has been determined, wherein the decoding rules comprise a set of acceptable errors associated with the at least one message type and a set of unacceptable errors associated with the at least one message type; and
  a message decoding manager residing within the High Level network layer wherein the message decoding manager sends the decoding rules to a message decoder residing at a network layer that is lower than the High Level network layer component, wherein the message decoder
 decodes at least a portion of a wirelessly transmitted message that has been received based on the decoding rules.

15. The wireless communication system of claim 14, wherein the decoding rules comprise at least one of:
 an error correction mask indicating which bits within a message associated with the at least one message type are ignored for determining messaging error and which bits within the message associated with the at least one message type are to be error free for determining messaging error;
 an allowable error threshold associated with the message associated with the at least one message type; and
 error weighting parameters associated with each bit in the message associated with the at least one message type.

16. The wireless communication system of claim 14, wherein the message decoder determines a unique signature associated with a wirelessly transmitted message.

17. The wireless communication system of claim 16, wherein the message decoder further determines a message type associated with the wirelessly transmitted message based on the unique signature associated with the wirelessly transmitted message that has been determined.

18. The wireless communication system of claim 14, wherein the message decoder further determines, in response to the decoding, if the wirelessly transmitted message comprises errors; and
    if the wirelessly transmitted message comprises errors, the message decoder identifies, based on the decoding rules, a set of errors that are acceptable in the wirelessly transmitted message and a set of errors that are unacceptable in the wirelessly transmitted message.

19. The wireless communication system of claim 14, further comprising:
    an error detection module residing in the Low Level network layer wherein the error detection module requests retransmission of at least a portion of the wirelessly transmitted message in response to the wirelessly transmitted message comprising a set of errors that are unacceptable based on the decoding rules.

20. The wireless communication system of claim 14, further comprising:
    an error correction module residing in the High Level network layer, wherein if the wirelessly transmitted message comprises errors that are acceptable based on the decoding rules, the error correction module corrects the errors that are acceptable based on a message type associated with the wirelessly transmitted message and communicatively couples the corrected wirelessly transmitted message to an application associated with the wirelessly transmitted message.

\* \* \* \* \*